United States Patent
Wang et al.

(10) Patent No.: US 8,799,762 B1
(45) Date of Patent: Aug. 5, 2014

(54) GENERATING FORMS FROM USER-DEFINED INFORMATION

(75) Inventors: Gang Wang, San Diego, CA (US); Gerald B. Huff, Berkeley, CA (US); William A. Lucchini, Sudbury, MA (US)

(73) Assignee: Intuit Inc., Mountain View, CA (US)

( * ) Notice: Subject to any disclaimer, the term of this patent is extended or adjusted under 35 U.S.C. 154(b) by 1153 days.

(21) Appl. No.: 12/566,401

(22) Filed: Sep. 24, 2009

(51) Int. Cl.
*G06F 17/00* (2006.01)

(52) U.S. Cl.
USPC .......................................... 715/222; 715/221

(58) Field of Classification Search
USPC .......................................... 715/222, 221, 200
See application file for complete search history.

(56) References Cited

U.S. PATENT DOCUMENTS

| | | | |
|---|---|---|---|
| 6,456,740 B1 * | 9/2002 | Carini et al. | 382/187 |
| 7,134,606 B2 * | 11/2006 | Chou | 235/494 |
| 8,271,864 B2 * | 9/2012 | Lynggaard et al. | 715/200 |
| 2009/0182527 A1 * | 7/2009 | Wiebe et al. | 702/150 |
| 2010/0096458 A1 * | 4/2010 | Pettersson et al. | 235/454 |
| 2011/0310066 A1 * | 12/2011 | Fermgrd et al. | 345/179 |

* cited by examiner

*Primary Examiner* — Manglesh M Patel
(74) *Attorney, Agent, or Firm* — Park, Vaughan, Fleming & Dowler LLP; Steven E. Stupp (57) ABSTRACT

A technique for generating a form is described. In the technique, a user provides information associated with a user-defined field, including a data type and/or semantic information for an entry associated with the user-defined field. Then, a computer system generates the form, which includes the user-defined field and additional fields based on the information associated with the user-defined field and the additional fields. This form includes a spatial reference pattern that, when printed on paper, facilitates data input using a writing instrument (such as a digital pen). Furthermore, generating the form may involve translating from a computer-input format of the form to a writing-instrument format based on specified layouts or sequential positions of the user-defined field and the additional fields. Next, the computer system provides the form to a user.

21 Claims, 7 Drawing Sheets

GENERATING FORMS FROM USER-DEFINED INFORMATION

BACKGROUND

The present invention relates to a technique for generating a form, and in particular, for dynamically generating a paper form based on user-defined data types and/or semantic information.

In spite of the proliferation of electronic forms, paper forms continue to be used by many companies. For example, many companies continue to use paper forms which are filled out by hand. However, converting such handwritten data from paper forms into an electronic format, which is suitable for subsequent processing, is typically difficult.

Digital pens have been proposed as a potential solution to this problem. Because digital pens dispense ink in the same way as existing pens, they can be used to fill out paper forms. In addition, digital pens can capture information about a user's pen strokes while filling out a form for subsequent processing.

However, forms that are used with digital pens are often specific to corresponding applications, and are typically developed on a case-by-case basis. In particular, a given one of these forms is usually produced through a complicated design and implementation process in which considerable expertise is needed to combine the visual layout of the form with the semantic meaning of the data fields and the backend database schema.

For example, a workflow may start with a visually designed form. A designer can manual crop out various regions in the form layout, and then may define their semantic meanings and associated data types. Next, when information captured by a digital pen is received, customized business logic can be developed to process the received information. Furthermore, the database schema is typically carefully tuned to match up with the processed results.

Such a workflow usually involves expert knowledge and a range of specific tools. This makes the entire application difficult to develop and deploy. Furthermore, because of the significant time and cost associated with implementing any changes, the forms are usually quasi-static. This makes it difficult to generate forms for different users, or to adapt forms over time as a given user's needs evolve.

SUMMARY

One embodiment of the present invention provides a method for providing a form, which may be performed by a computer system. During operation, the computer system receives information associated with a user-defined field, where the information includes a data type and/or semantic information for an entry associated with the user-defined field. Then, the computer system generates a form which includes the user-defined field and additional fields based on the information associated with the user-defined field and the additional fields. The form includes a spatial reference pattern that, when printed on paper, facilitates data input using a writing instrument. Next, the computer system provides the form to a user.

For example, the form may be a for suitable for printing on paper, and providing the form may include providing the form in a format that is suitable for printing.

In some embodiments, the computer system receives relative-location information for the writing instrument with respect to the spatial reference pattern and field information, where the relative-location information and the field information are determined when the writing instrument is manipulated by the user while filling in a portion of the form. After receiving the relative-location information, the computer system may extract writing information from the relative-location information. For example, extracting the writing information may involve: optical character recognition, shape recognition and/or handwriting recognition.

Furthermore, the computer system may determine an entry for the user-defined field and/or the additional fields based on the data type or semantic information associated with the user-defined field and/or the additional fields. Additionally, the computer system may verify the determined entry based on the data type and/or the semantic information associated with the user-defined field and the additional fields.

Note that the writing instrument may include a digital pen. Moreover, the spatial reference pattern may be embedded in the form as a watermark. Additionally, the information associated with the user-defined field may specify a layout of the user-defined field and/or a sequential position of the user-defined field in the form.

In some embodiments, generating the form involves translating from a computer-input format of the form to a writing-instrument format based on specified layouts or sequential positions of the user-defined field and the additional fields. For example, generating the form may involve translating from a Hypertext Markup Language (HTML) format of the form to a visual layout of the form based on the specified layouts or the sequential positions of the user-defined field and the additional fields. This visual layout may include presenting fields with multiple associated choices with pen-compatible input areas, for example, by including proximate checkable boxes.

Furthermore, in some embodiments the form is associated with financial software, which has predefined entries for fields other than the user-defined field and the additional fields.

Another embodiment includes the computer system.

Another embodiment includes a computer-program product for use with the computer system. This computer-program product includes instructions for at least some of the operations in the method.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a technique for providing a form, and a computer-program product (e.g., software) for use with the computer system are described. In the technique, a user provides information associated with a user-defined field, including a data type and/or semantic information for an entry associated with the user-defined field. Then, the computer system generates the form, which includes the user-defined field and additional fields based on the information associated with the user-defined field and the additional fields. This form includes a spatial reference pattern that, when printed on paper, facilitates data input using a writing instrument (such as a digital pen). Furthermore, generating the form may involve translating from a computer-input format of the form to a writing-instrument format based on specified layouts or sequential positions of the user-defined field and the additional fields. Next, the computer system provides the form to a user. The user may printout the form and may fill in the fields using the writing instrument. These entries may be extracted and input into software, thereby providing an end-to-end process.

This technique facilitates a fully automated data-to-data approach for dynamically generating the form. In particular, it may eliminate the need for expert involvement in constructing and maintaining the relationships between printed forms, data from the writing instrument, and backend business logic and a database schema. As a consequence, it may reduce the time and expense associated with generating forms. Furthermore, this technique may allow users to generate and/or modify forms as needed.

Figure 1:
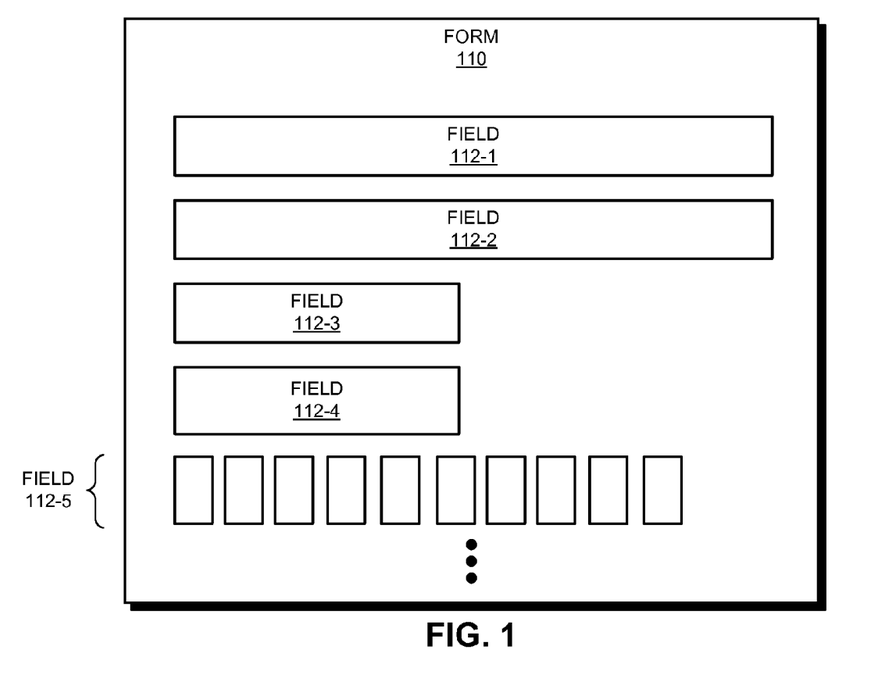
FIG. 1 is a block diagram illustrating a form in accordance with an embodiment of the present invention.

We now describe embodiments of a form. FIG. 1 presents a block diagram illustrating a form 110. This form includes fields 112 that a user can fill in to provide entries. An entry for a given field, such as field 112-5, is associated with a data type and/or semantic information. For example, the entry for field 112-5 may correspond to a 10-digit phone number. Moreover, the layout of form 110 is designed to make it easier for the user to fill in the form, and to simplify subsequent recovery and processing of the entries provided. (Thus, field 112-5 includes ten separate boxes, which correspond to respective digits in a 10-digit phone number.)

The challenge in generating forms, such as form 110, and processing the data provided using them, is in matching the corresponding database schema, metadata associated with the entries (such as data types and/or semantic information), with the visual layout of the forms. In particular, in existing techniques generating a given form typically involves one or more experts manually defining what data will be provided using the form, and manually defining what this data means in a database schema. This process may involve defining metadata that: identifies an instance of the form; specifies the form layout (such as the fields and/or areas of interest); ties the areas of interest to a database schema for use in subsequent data extraction; and ties the extracted data to additional business logic. Furthermore, in existing techniques forms and the associated backend processes are often engineered separately, which results in errors. Using such lock-step processes, these problems often make developing and maintaining forms expensive and time consuming.

In the discussion that follows, a generating technique that addresses these problems is described. In this technique, form generation and data processing are based on a common data model. This data model includes user-defined information for entries associated with one or more data-capture areas, such as one or more fields 112, as well as additional information for entries associated with additional fields in fields 112. Note that the user-defined information and the additional information may include: data types, semantic information, specified layouts, labels/prompts, help/descriptive text and/or sequential positions of fields 112. Therefore, the data model directly or indirectly provides the positions of fields 112 in form 110, and the metadata associated with the entries for fields 112.

Using the data model, the visual layout of form 110 can be generated, for example, by translating form 110 from a computer-input format to a writing-instrument format. Furthermore, the data model facilitates subsequent processing of data provided using form 110, including data extraction and analysis.

This generating technique may simplify form development and maintenance. Furthermore, it may eliminate the need for: a manual design process, the use of experts, or the use of complicated design tools. As a consequence, it may reduce the time and expense associated with generating forms, which may allow users to dynamically generate and/or modify forms as needed.

Additionally, the generating technique may allow forms that are compatible with writing instruments (such as digital pens) to be generated. This may facilitate a computer-implemented data-to-data user experience. For example, a user may provide at least a portion of the data model. Then, the user may print out a form that includes a spatial reference pattern (such as a dot-pattern-enabled form). Next, the user may fill in this form using a digital pen, which captures the user's strokes and gestures (which are henceforth referred to as relative-location information). This relative-location information may be provided to a computer system that extracts writing information using the data model, and then processes the extracted writing information (including error correction, warning and/or record insertion). Furthermore, the user can subsequently add a field to the data model or modify the metadata associated with an entry for an existing field, and can generate a revised form with ease.

Thus, the generating technique may enable data collection using the form and a digital pen without requiring costly customization (which may expand the use of digital pens and the associated forms). For example, because the generating technique works at the metadata level (via the data model), it is generic and can be included in a variety of database and software applications as a 'function' (as opposed to an expensive, customized service in the existing techniques).

Figure 2:
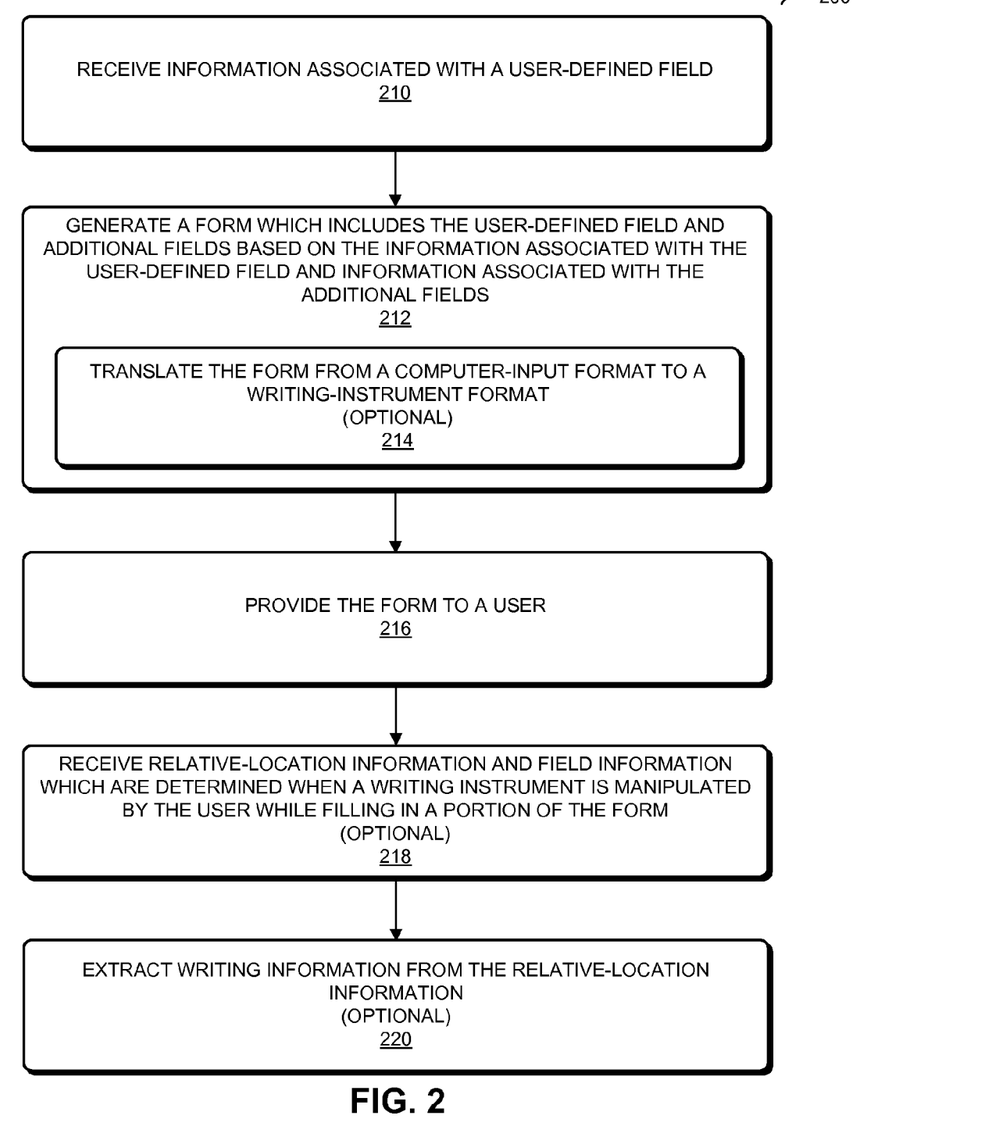
FIG. 2 is a flow chart illustrating a method for providing the form of FIG. 1 in accordance with an embodiment of the present invention.

We now describe embodiments of a process for providing form 100. FIG. 2 presents a flow chart illustrating a method 200 for providing a form, which may be performed by a computer system. During operation, the computer system receives information associated with a user-defined field (210), including a data type and/or semantic information for an entry associated with the user-defined field. Then, the computer system generates a form which includes the user-defined field and additional fields based on the information associated with the user-defined field and the additional fields (212). This form includes a spatial reference pattern (such as a watermark) that, when printed on paper, facilitates data input using a writing instrument (such as a digital pen). Next, the computer system provides the form to a user (216).

In some embodiments, generating the form (216) optionally involves translating from a computer-input format of the form to a writing-instrument format based on specified layouts or sequential positions of the user-defined field and the additional fields (214) (which may be included in the information associated with the user-defined field and/or the information associated with the additional fields). For example, generating the form may involve translating from a Hypertext Markup Language (HTML) format of the form to a visual layout of the form based on specified layouts or sequential positions of the user-defined field and the additional fields.

Furthermore, in some embodiments the computer system optionally receives relative-location information for the writing instrument with respect to the spatial reference pattern and field information (218), where the relative-location information and the field information are determined when the writing instrument is manipulated by the user while filling in a portion of the form. After receiving the relative-location information, the computer system may optionally extract writing information from the relative-location information (220). For example, extracting the writing information may involve: optical character recognition, shape recognition and/or handwriting recognition.

In some embodiments, the computer system determines an entry for at least one of the user-defined field and the additional fields based on the data type or semantic information associated with at least one of the user-defined field and the additional fields. Additionally, the computer system may verify the determined entry based on the data type or the semantic information associated with the user-defined field and the additional fields.

In some embodiments of method 200, there are additional or fewer operations. Moreover, the order of the operations may be changed and/or two or more operations may be combined into a single operation.

In an exemplary embodiment, the generating technique uses a data-driven design/implementation. In particular, instead of starting with a visual layout of a form (such as form 110 in FIG. 1), it starts with a data-model description. For example, a data model in a table in QuickBase™, from Intuit, Inc., of Mountain View, Calif., may be used). (However, note that the generating technique may be used with a wide variety of tools that allow users to develop a database and/or one or more forms.) This data model may include data types, such as entries for: an address field, a city field, a country field, a ZIP-code field, a phone-number field, an email field, etc. Furthermore, there may be semantic information associated with the entry for a given field. For example, the phone-number field may be associated with a 10-digit phone number, the ZIP-code field may be associated with a 5- or 9-digit ZIP code, the email address field may be associated with an email address that includes an '@,' etc. Collectively, this information in the data model is sufficient to define a computer-input format for a form in which a user can manually input data, for example, using a web browser.

Additionally, the data model may include layout and/or sequential-position information for the fields, which may be used to generate the visual layout of a writing-instrument format of the form. This additional information may be used to construct a visual layout of a form that is suitable for digital-pen input, and to program a backend generator that processes data provided via this form. In particular, the computer-input format may be transformed to the writing-instrument format. This transformation may be performed at the metadata level. For example, a field designated as a phone-number field may be translated into ten boxes in the visual-form layout to facilitate subsequent extraction of writing information using techniques such as: handwriting recognition, optical character recognition and/or shape recognition. Furthermore, a spatial reference pattern, such as a dot pattern, may be included in the generated visual layout to facilitate direct printing of the form. Additionally, the translation may be maintained for use in subsequent data processing after the writing information is extracted.

Figure 3:
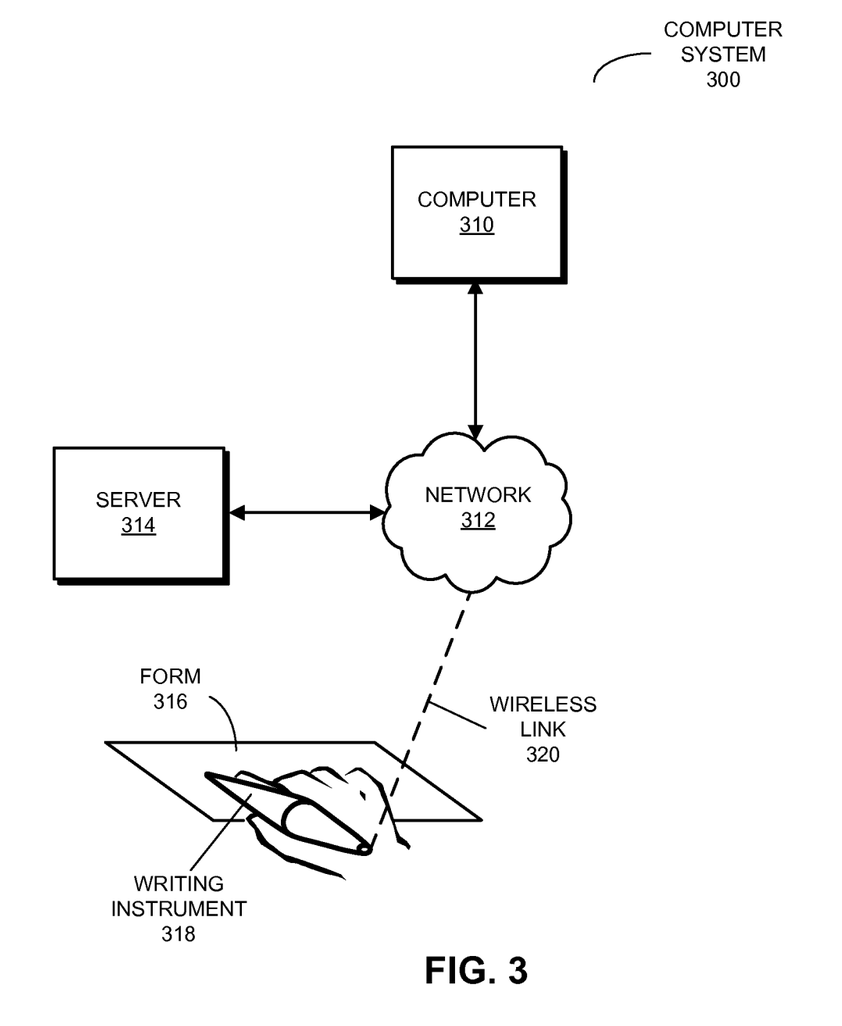
FIG. 3 is a block diagram illustrating a networked computer system that provides the form of FIG. 1 in accordance with an embodiment of the present invention.

We now describe a computer system that may perform method 200. FIG. 3 presents a block diagram illustrating a networked computer system 300. In this computer system, a user of computer 310 may provide metadata associated with one or more entries or fields in a form, which is included in a table in a data model. This metadata may be provided using a stand-alone application, such as financial software, or a portion of another application that is resident on and which executes on computer 310. Alternatively and/or additionally, at least a portion of the financial software or the other application may be a software application tool (provided by server 314 via network 312) that is embedded in a web page (and which executes in a virtual environment of a web browser). In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing: JavaScript, ECMAScript instructions, VBScript instructions, or instructions in another programming language suitable for rendering by the web browser or another client application on computer 310.

Then, the financial software may generate and print out form 316 in response to a user command or instruction. For example, the user may activate an icon or an object in a user interface of the financial software. Note that the form may include the user-defined fields as well as additional fields (such as predefined fields and/or entries associated with the financial software).

Next, the user or another user manipulates writing instrument 318 relative to form 316 (which includes a spatial reference pattern) to fill in at least a portion of form 316. For example, the spatial reference pattern may be printed on form 316 (such as in a so-called 'watermark'). Writing instrument 318 optically captures what is written on form 316. In general, the captured information may include: one or more gestures, one or more drawings, and/or writing. This captured information is included in the relative position (e.g., coordinates) of writing instrument 318 with respect to form 316 as a function of time (which is referred to as relative-location information).

Furthermore, writing instrument 318 provides the captured information to the financial software on computer 310 and/or server 314. In some embodiments, writing instrument 318 transmits the captured relative-location information, for example, via a wireless link 320. Alternatively or additionally, the captured information is transmitted when writing instrument 318 is plugged in to or coupled to computer 310.

After receiving the relative-location information, the financial software may extract writing information from the relative-location information. In particular, the financial software, as well as hardware in computer 310 and/or server 314, may interpret the relative-location information. For example, this software may extract the writing information using: optical character recognition, shape recognition and/or handwriting recognition. Furthermore, the extracted information may be input into the financial software (for example, via a database), thereby saving the time and effort associated with manual entry. Entry of this extracted information may be based on the metadata (such as the semantic data) and that was provided by the user.

Note that the extracted writing information may be stored on computer 310, server 314 and/or at one or more other locations in computer system 300 (i.e., locally or remotely). Moreover, because this information may be sensitive in nature, it may be encrypted. For example, stored information and/or information communicated via network 312 and/or wireless link 320 may be encrypted.

In exemplary embodiments, the financial software includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information.

Figure 4:
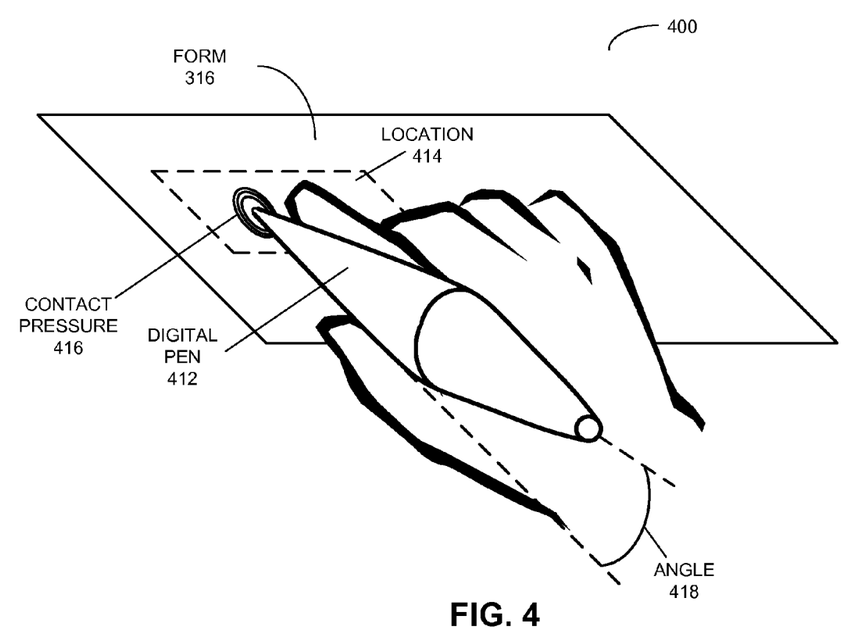
FIG. 4 illustrates the use of a digital pen to fill in a form in accordance with an embodiment of the present invention.

While a wide variety of writing instruments may be used to fill in form 316, in the discussion that follows a digital pen is used as an illustration. FIG. 4 presents a drawing 400 that illustrates the use of a digital pen 412 to fill in form 316. While a user is writing, digital pen 412 may capture writing or location information and/or reference information (which is referred to collectively as relative-location information). For example, the relative-location information may include a writing style of the individual, including: one or more strokes of digital pen 412, an angle 418 of digital pen 412 while the individual is writing, and/or a contact pressure 416 of digital pen 412 while the individual is writing. Moreover, digital pen 412 may capture context information, such as one or more fields or locations (such as location 414) on form 316. Note that, in conjunction with the data model, the captured relative-location information can therefore tie position information with the form layout, which allows the writing information to be extracted based on the visual layout. In addition, the relative-location information at various locations can be mapped back to the fields in form 316.

As noted previously, in some embodiments form 316 includes a spatial reference pattern that includes at least a portion of the reference information. For example, form 316 may be a piece of paper that has a watermark or background pattern (such as a pattern generated using micro dots). This spatial reference pattern may include metadata for the individual and/or form 316, which can be captured by digital pen 412 while the individual is writing. For example, the metadata may include an identifier for the user of digital pen 412 and/or an identifier for form 316. In some embodiments, the spatial reference pattern is uniquely associated with form 316. For example, a given surface may include a spatial reference pattern with a corresponding identifier that identifies at least a portion of the metadata, which may be remotely stored in a data structure associated with one or more users (for example, in memory in server 314 in FIG. 3). This stored metadata may be accessed when the captured relative-location information from digital pen 412 is processed.

In addition, the spatial reference pattern may include spatial markers that can be used to determine the location or motion of digital pen 412 relative to form 316 and/or one or more locations (such as location 414) on form 316. Using these spatial markers, digital pen 412 may capture the relative-location information while a user is writing on form 316. This relative-location information may include one or more gestures or strokes of digital pen 412. For example, a given stroke may include: a starting point on the surface, an end point on the surface and a time stamp.

At least a portion of the captured data, such as the relative-location information, may be communicated from digital pen 412 approximately in real time, i.e., as the user writes on form 316. For example, captured data may be communicated to computer 310 and/or server 314 (FIG. 3) via a wireless network (such as via wireless link 320 in FIG. 3). Alternatively or additionally, at least a portion of the captured data may be temporarily stored, and may be subsequently communicated from digital pen 412, i.e., after the user has finished writing or after a predetermined time interval, to computer 310 (FIG. 3) and/or server 314 (FIG. 3).

During subsequent processing, writing information may be determined from the relative-location information. In particular, using the one or more strokes and the data model, an analysis technique (such as an optical character-recognition technique, shape-recognition technique and/or handwriting-recognition technique) may be used to determine the writing information. In some embodiments, at least a portion of this extraction process is performed on digital pen 412. Alternatively or additionally, this extraction process may, at least in part, be performed on computer 310 (FIG. 3) and/or server 314 (FIG. 3).

Because the writing information and/or the reference information may be sensitive, in some embodiments such information may be encrypted. For example, a portion of the relative-location information and/or the reference information may be encrypted prior to communication from digital pen 412 to computer 310 (FIG. 3) and/or server 314 (FIG. 3).

Figure 5:
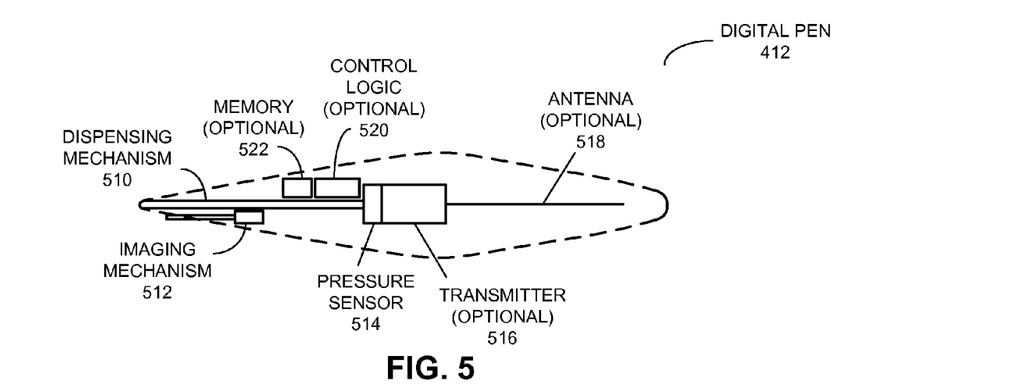
FIG. 5 is a block diagram illustrating the digital pen of FIG. 4 in accordance with an embodiment of the present invention.

FIG. 5 presents a block diagram illustrating digital pen 412. This digital pen may include a dispensing mechanism 510, which may dispense ink when the digital pen is in contact with form 316 (FIGS. 3 and 4). Moreover, digital pen 412 may include an optical imaging mechanism 512 (such as a charge coupled device or a CMOS imaging sensor) that optically captures the relative-location information associated with the location or motion of digital pen 412 relative to form 316 (FIGS. 3 and 4) and/or the reference information in the spatial reference pattern. In some embodiments, this captured relative-location information is stored, at least temporarily, in optional memory 522. Furthermore, digital pen 412 may include pressure sensor 514 that detects when dispensing mechanism 510 is in contact with form 316 (FIGS. 3 and 4), and then activates imaging mechanism 512.

In some embodiments, digital pen 412 includes optional control logic 520 which facilitates the functionality of digital pen 412. Digital pen 412 may also include an optional transmitter 516 and an optional antenna 518 to communicate the captured relative-location information to computer 310 (FIG. 3) and/or server 314 (FIG. 3). Alternatively or additionally, digital pen 412 may include a connector, such as a Universal Serial Bus (USB) port, which allows digital pen 412 to be coupled to an electronic device (such as computer 310 in FIG. 3).

Note that, while the preceding embodiments have used optical capture of the relative-location information as an illustration, other techniques can be used. For example, computer system 300 (FIG. 3) may include a local positioning system which is used to determine the relative-location information of writing instrument 318 (FIG. 3) as the user manipulates it relative to form 316 (FIGS. 3 and 4).

Figure 6:
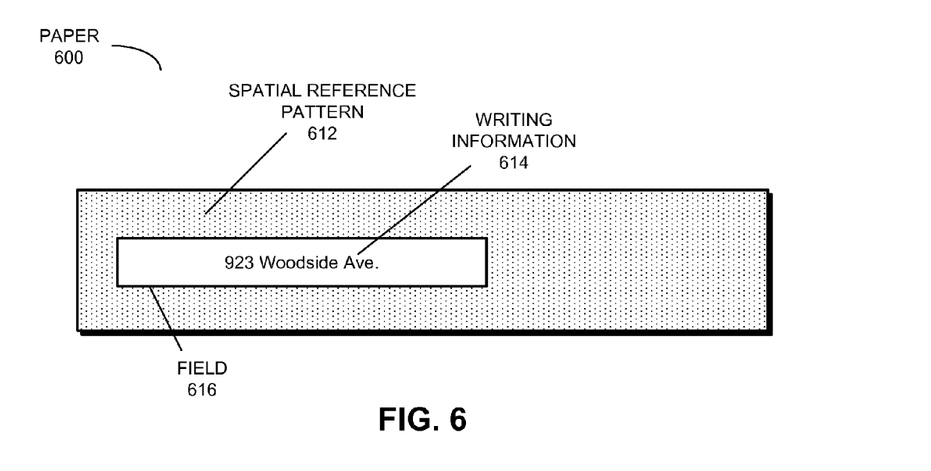
FIG. 6 is a block diagram illustrating paper that includes a spatial reference pattern in accordance with an embodiment of the present invention.

As discussed previously, in some embodiments form 316 (FIGS. 3 and 4) is a printed piece of paper. This is shown in FIG. 6, which presents a block diagram illustrating paper 600 that includes a spatial reference pattern 612. For example, this spatial reference pattern may be printed or embossed on paper 600. Furthermore, spatial reference pattern 612 may include spatial markers and/or reference information associated with paper 600 or a user. Spatial reference pattern 612 may allow digital pen 412 (FIGS. 4 and 5) to capture the relative-location information, which in turn may be used by digital pen 412 (FIGS. 4 and 5), computer 310 (FIG. 3) and/or server 314 (FIG. 3) to extract writing information 614.

In some embodiments, paper 600 includes one or more fields or locations, such as field 616, which are associated with particular entries. Moreover, these entries may be associated with data types and/or semantic information via the data model.

Figure 7:
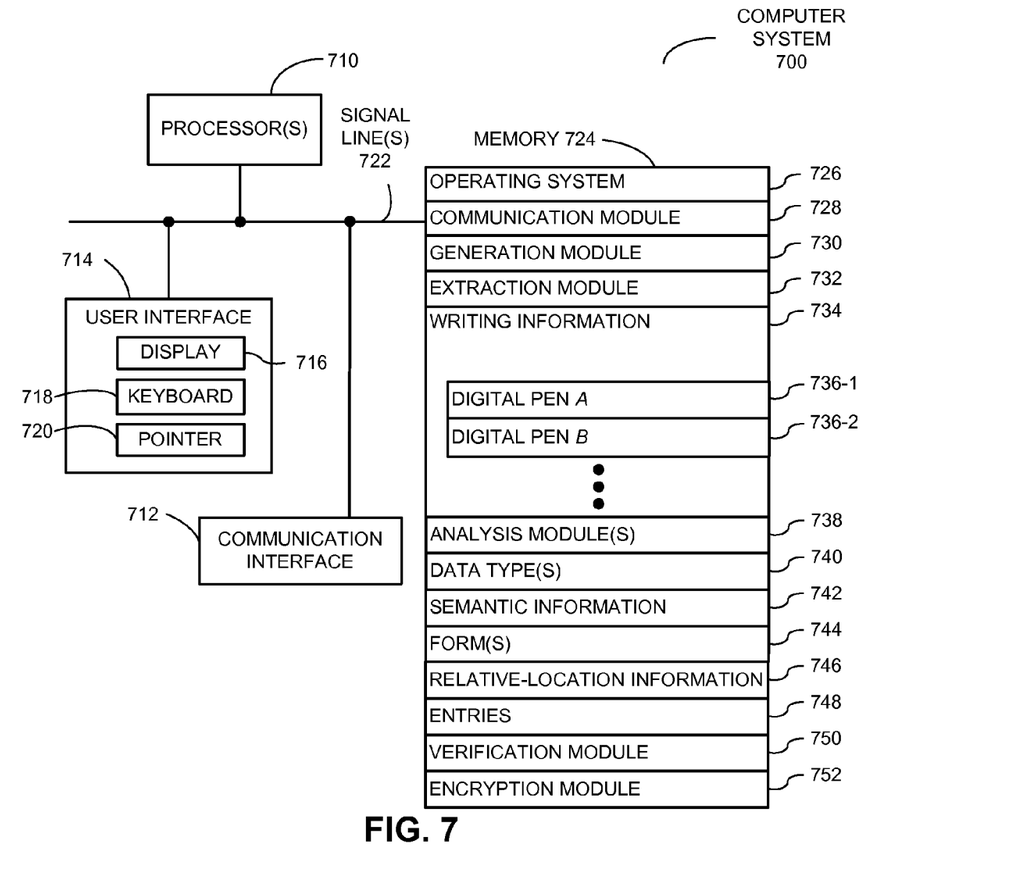
FIG. 7 is a block diagram illustrating a computer system that performs the method of FIG. 2 in accordance with an embodiment of the present invention.

We now further describe embodiments of the computer system. FIG. 7 presents a block diagram illustrating a computer system 700 that performs method 200 (FIG. 2). Computer system 700 includes one or more processors 710, a communication interface 712, a user interface 714, and one or more signal lines 722 coupling these components together. Note that the one or more processing units 710 may support parallel processing and/or multi-threaded operation, the communication interface 712 may have a persistent communication connection, and the one or more signal lines 722 may constitute a communication bus. Moreover, the user interface 714 may include: a display 716, a keyboard 718, and/or a pointer 720, such as a mouse.

Memory 724 in computer system 700 may include volatile memory and/or non-volatile memory. More specifically, memory 724 may include: ROM, RAM, EPROM, EEPROM, flash memory, one or more smart cards, one or more magnetic disc storage devices, and/or one or more optical storage devices. Memory 724 may store an operating system 726 that includes procedures (or a set of instructions) for handling various basic system services for performing hardware-dependent tasks. Memory 724 may also store procedures (or a set of instructions) in a communication module 728. These communication procedures may be used for communicating with one or more writing instruments, and/or other electronic devices (such as computers and/or servers), including computers and/or servers that are remotely located with respect to computer system 700.

Memory 724 may also include multiple program modules (or sets of instructions), including: generation module 730 (or a set of instructions), extraction module 732 (or a set of instructions), one or more analysis modules 738 (or a set of instructions), verification module 750 (or a set of instructions), and/or encryption module 752 (or a set of instructions). Note that one or more of these program modules (or sets of instructions) may constitute a computer-program mechanism.

Communication module 728 may receive one or more user-defined data types 740 and/or semantic information 742 for one or more entries associated with corresponding fields in one or more forms 744. In addition, communication module 728 may receive locations and/or sequential positions of these fields in the one or more forms 744. Then, generating module 730 may use this information to dynamically generate a given form in forms 744. In some embodiments, this involves translating the given form from a computer-input format to a writing-instrument format.

Subsequently, communication module 728 may receive relative-location information 746 that was captured while one or more users filled in one or more of forms 744. Extraction module 732 may use one or more analysis techniques 738 (such as optical character recognition, shape recognition and/or handwriting recognition), one or more data types 740 and/or semantic information 742 to extract writing information 734 from relative-location information 746. For example, writing information 734 may include writing information associated with digital pen A 736-1 and/or digital pen B 736-2.

Furthermore, verification module 750 may use the one or more data types 740 and/or semantic information 742 to perform error detection and/or correction on writing information 734, thereby providing validated entries 748 associated with fields in one or more of forms 744.

In some embodiments, at least some of the information stored in memory 724 and/or at least some of the information communicated using communication module 728 is encrypted using encryption module 752.

Instructions in the various modules in the memory 724 may be implemented in: a high-level procedural language, an object-oriented programming language, and/or in an assembly or machine language. Note that the programming language may be compiled or interpreted, e.g., configurable or configured, to be executed by the one or more processing units 710.

Although computer system 700 is illustrated as having a number of discrete items, FIG. 7 is intended to be a functional description of the various features that may be present in computer system 700 rather than a structural schematic of the embodiments described herein. In practice, and as recognized by those of ordinary skill in the art, the functions of computer system 700 may be distributed over a large number of servers or computers, with various groups of the servers or computers performing particular subsets of the functions. In some embodiments, some or all of the functionality of computer system 700 may be implemented in one or more application-specific integrated circuits (ASICs) and/or one or more digital signal processors (DSPs). Computer systems 300 (FIG. 3) and 700 may include one of a variety of devices capable of manipulating computer-readable data or communicating such data between two or more computing systems over a network, including: a personal computer, a laptop computer, a mainframe computer, a portable electronic device (such as a cellular phone or PDA), a server, a client computer (in a client-server architecture) or another device capable of manipulating computer-readable data. Moreover, communication with computer systems 300 (FIG. 3) and 700 may occur over a variety of networks, such as: a wired network, a wireless network, an optical network, the Internet, World Wide Web or WWW, an intranet, LAN, WAN, MAN, or combination of networks, or other technology enabling communication between electronic devices or computing systems.

Form 110 (FIG. 1), computer system 300 (FIG. 3), digital pen 412 (FIGS. 4 and 5), paper 600 (FIG. 6) and/or computer system 700 may include fewer components or additional components. For example, in some embodiments, paper 600 (FIG. 6) is regular paper, i.e., paper that does not include metadata and/or a reference pattern (such as spatial reference pattern 612 in FIG. 6). In these embodiments, the relative-location information may be determined using another technique, such as using a local positioning system. Moreover, two or more components may be combined into a single component, and/or a position of one or more components may be changed. In some embodiments, the functionality of computer systems 300 (FIG. 3) and 700 may be implemented more in hardware and less in software, or less in hardware and more in software, as is known in the art.

Figure 8:
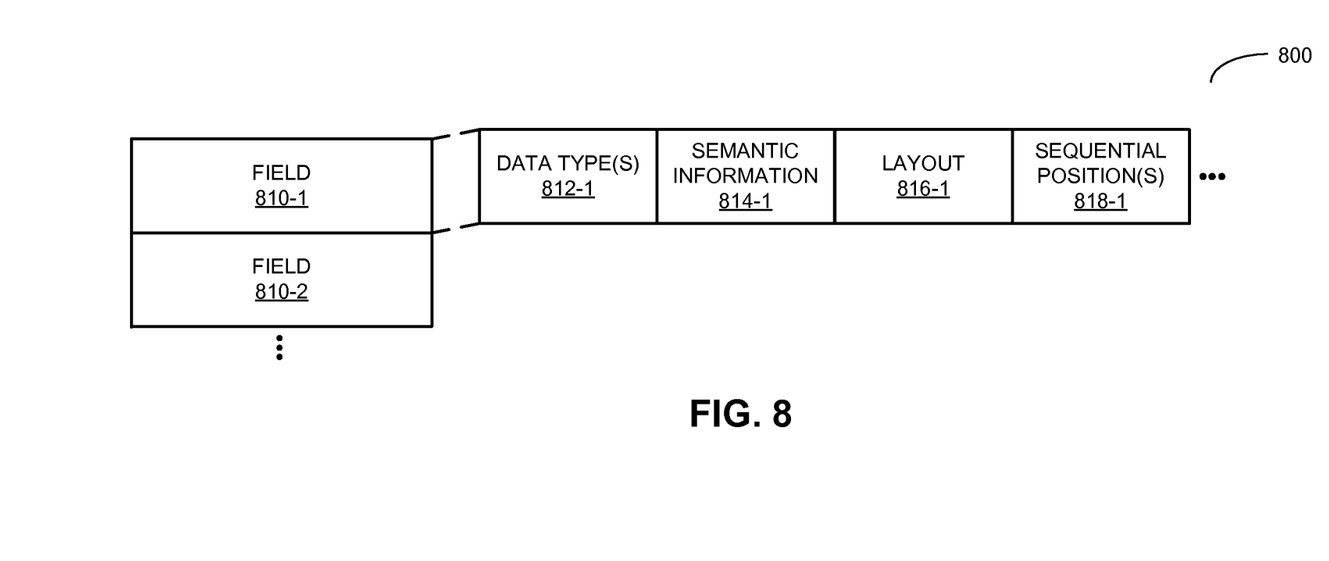
FIG. 8 is a block diagram illustrating a data structure for use in the computer system of FIGS. 3 and 7 in accordance with an embodiment of the present invention.

We now discuss data structures that may be used in computer systems 300 (FIG. 3) and/or 700. FIG. 8 presents a block diagram illustrating a data structure 800, such as a data model. This data structure may include information for entries associated with one or more fields 810. For example, the information for the entry associated with field 810-1 may include: one or more data types 812-1, semantic information 814-1, one or more locations 816-1 on a form, and/or one or more sequential positions of field 810-1 in the form.

In some embodiments of data structure 800 there may be fewer or additional components. Moreover, two or more components may be combined into a single component and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for providing a form, comprising:
    receiving information associated with a user-defined field, wherein the information associated with the user-defined field includes a data type or semantic information for an entry associated with the user-defined field, wherein the information corresponds to metadata associated with the user-defined field;
    dynamically generating a writing instrument format of a form which includes the user-defined field and additional fields based on the information associated with the user-defined field, wherein the form includes a spatial reference pattern comprising the metadata associated with at least a user of a writing instrument wherein when the form is printed on paper, the spatial reference pattern facilitates data input by the user using the writing instrument;
    providing the form to the user;
    receiving relative-location information for the writing instrument with respect to the spatial reference pattern and field information;
    extracting writing information from the relative-location information; and
    determining an entry for at least one of the user-defined field and the additional fields based on the metadata associated with the user-defined field and the additional fields, thereby eliminating the need to construct and maintain at least a relationship between the writing instrument format of the form and the data input by the user using the writing instrument.

2. The method of claim 1, wherein the relative-location information and the field information are determined when the writing instrument is manipulated by a user while filling in a portion of the form.

3. The method of claim 1, wherein extracting the writing information involves optical character recognition, shape recognition or handwriting recognition.

4. The method of claim 1, further comprising verifying the determined entry based on the data type or the semantic information associated with the user-defined field and the additional fields.

5. The method of claim 1, wherein the writing instrument includes a digital pen.

6. The method of claim 1, wherein the information associated with the user-defined field specifies a layout of the user-defined field or a sequential position of the user-defined field in the form.

7. The method of claim 1, wherein generating the form involves translating from a computer-input format of the form to a writing-instrument format of the form based on user-specified layouts or sequential positions of the user-defined field and the additional fields.

8. The method of claim 1, wherein generating the form involves translating from a Hypertext Markup Language (HTML) format of the form to a visual layout of the form based on specified layouts or sequential positions of the user-defined field and the additional fields.

9. The method of claim 1, wherein the spatial reference pattern is embedded in the form as a watermark.

10. The method of claim 1, wherein the form is associated with financial software; and
    wherein the financial software has predefined entries for fields other than the user-defined field and the additional fields.

11. A computer-program product for use in conjunction with a computer system, the computer-program product comprising a non-transitory computer-readable storage medium and a computer-program mechanism embedded therein for providing a form, the computer-program mechanism including:
    instructions for receiving information associated with a user-defined field, wherein the information associated with the user-defined field includes a data type or semantic information for an entry associated with the user-defined field, wherein the information corresponds to metadata associated with the user-defined field;
    instructions for dynamically generating a writing instrument format of a form which includes the user-defined field and additional fields based on the information associated with the user-defined field and the additional fields, wherein the form includes a spatial reference pattern comprising the metadata associated with at least a user of a writing instrument, wherein when the form is printed on paper, the spatial reference pattern facilitates data input by the user using the writing instrument; and
    instructions for providing the form to the user;
    instructions for receiving relative-location information for the writing instrument with respect to the spatial reference pattern and field information;
    instructions for extracting writing information from the relative-location information; and
    instructions for determining an entry for at least one of the user-defined field and the additional fields based on the metadata associated with the user-defined field and the additional fields, thereby eliminating the need to construct and maintain at least a relationship between the writing instrument format of the form and the data input by the user using the writing instrument.

12. The computer-program product of claim 11, wherein the relative-location information and the field information are determined when the writing instrument is manipulated by a user while filling in a portion of the form.

13. The computer-program product of claim 11, wherein extracting the writing information involves optical character recognition, shape recognition or handwriting recognition.

14. The computer-program product of claim 11, wherein the computer-program mechanism further includes instructions for verifying the determined entry based on the data type or the semantic information associated with the user-defined field and the additional fields.

15. The computer-program product of claim 11, wherein the writing instrument includes a digital pen.

16. The computer-program product of claim 11, wherein the information associated with the user-defined field specifies a layout of the user-defined field or a sequential position of the user-defined field in the form.

17. The computer-program product of claim 11, wherein generating the form involves translating from a computer-input format of the form to a writing-instrument format of the form based on user-specified layouts or sequential positions of the user-defined field and the additional fields.

18. The computer-program product of claim 11, wherein generating the form involves translating from a Hypertext Markup Language (HTML) format of the form to a visual layout of the form based on specified layouts or sequential positions of the user-defined field and the additional fields.

19. The computer-program product of claim 11, wherein the spatial reference pattern is embedded in the form as a watermark.

20. The computer-program product of claim 11, wherein the form is associated with financial software; and wherein the financial software has predefined entries for fields other than the user-defined field and the additional fields.

21. A computer system, comprising:
a processor;
memory; and
  a program module, wherein the program module is stored in the memory and configurable to be executed by the processor, the program module including:
instructions for receiving information associated with a user-defined field, wherein the information associated with the user-defined field includes a data type or semantic information for an entry associated with the user-defined field, wherein the information corresponds to metadata associated with the user-defined field;
instructions for dynamically generating a writing instrument format of a form which includes the user-defined field and additional fields based on the information associated with the user-defined field and the additional fields, wherein the form includes a spatial reference pattern comprising metadata associated with at least a user of a writing instrument, wherein when the form is printed on paper, the spatial reference pattern facilitates data input by the user using a writing instrument;
instructions for providing the form to the user;
instructions for receiving relative-location information for the writing instrument with respect to the spatial reference pattern and field information;
instructions for extracting writing information from the relative-location information; and
instructions for determining an entry for at least one of the user-defined field and the additional fields based on the metadata associated with the user-defined field and the additional fields, thereby eliminating the need to construct and maintain at least a relationship between the writing instrument format of the form and the data input by the user using the writing instrument.

\* \* \* \* \*